L. PHILLIPS.
ILLUSION APPARATUS.
APPLICATION FILED SEPT. 19, 1919.

1,370,223.

Patented Mar. 1, 1921.
2 SHEETS—SHEET 1.

INVENTOR
Louis Phillips
BY
Warren D. House
His ATTORNEY

Witness:
R. E. Hamilton

L. PHILLIPS.
ILLUSION APPARATUS.
APPLICATION FILED SEPT. 19, 1919.
1,370,223.
Patented Mar. 1, 1921.
2 SHEETS—SHEET 2.
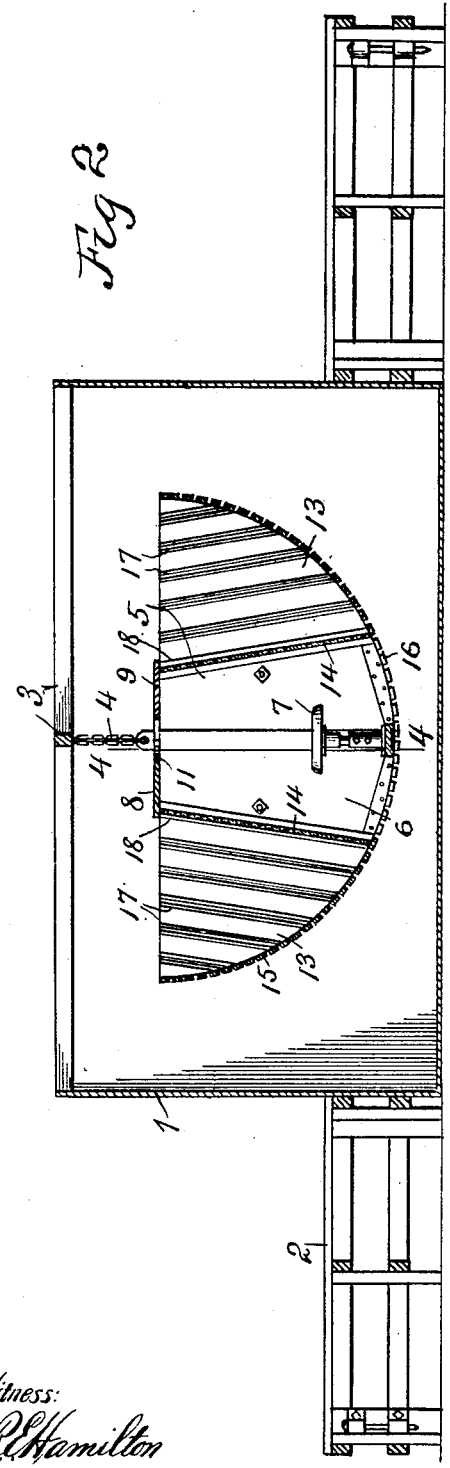
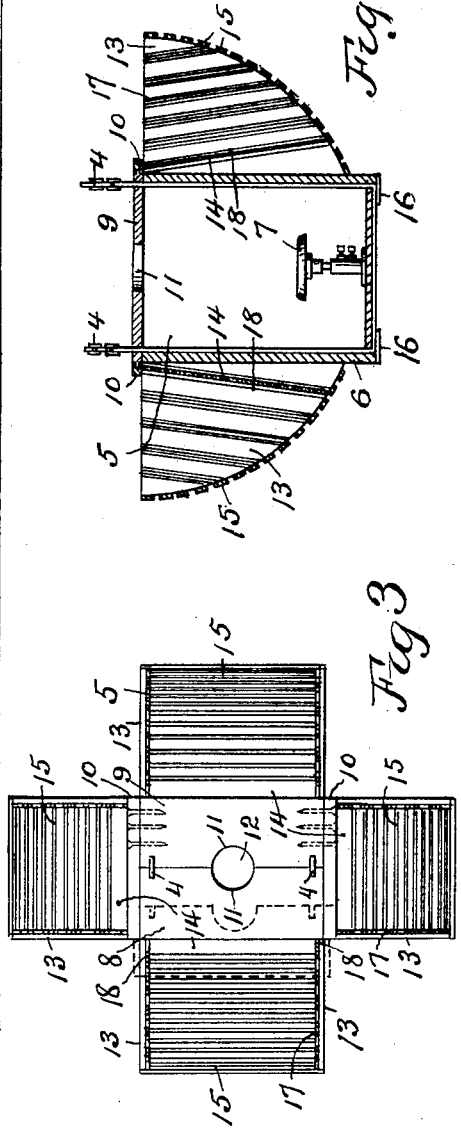
Witness:
R.E.Hamilton
INVENTOR
Louis Phillips
BY
Warren D. House
His ATTORNEY

UNITED STATES PATENT OFFICE.

LOUIS PHILLIPS, OF NEW YORK, N. Y., ASSIGNOR TO CHARLES W. PARKER, OF LEAVENWORTH, KANSAS.

ILLUSION APPARATUS.

1,370,223.   Specification of Letters Patent.   Patented Mar. 1, 1921.

Application filed September 19, 1919. Serial No. 324,844.

*To all whom it may concern:*

Be it known that I, LOUIS PHILLIPS, a citizen of the United States, residing at New York city, in the borough of Manhattan and State of New York, have invented a certain new and useful Improvement in Illusion Apparatus, of which the following is a specification.

My invention relates to improvements in illusion apparatus.

The object of my invention is to provide a novel illusion apparatus which is mystifying and which will afford entertainment to young and old.

The novel features of my invention are hereinafter fully described and claimed.

In the accompanying drawings which illustrate the preferred embodiment of my invention, Figure 1 is a perspective view, partly broken away, of my improved illusion apparatus.

Fig. 2 is a vertical sectional view of the same.

Fig. 3 is a plan view of the swinging support.

Fig. 4 is a vertical sectional view on the line 4—4 of Fig. 2.

Similar reference characters designate similar parts in the different views.

Figure 1:
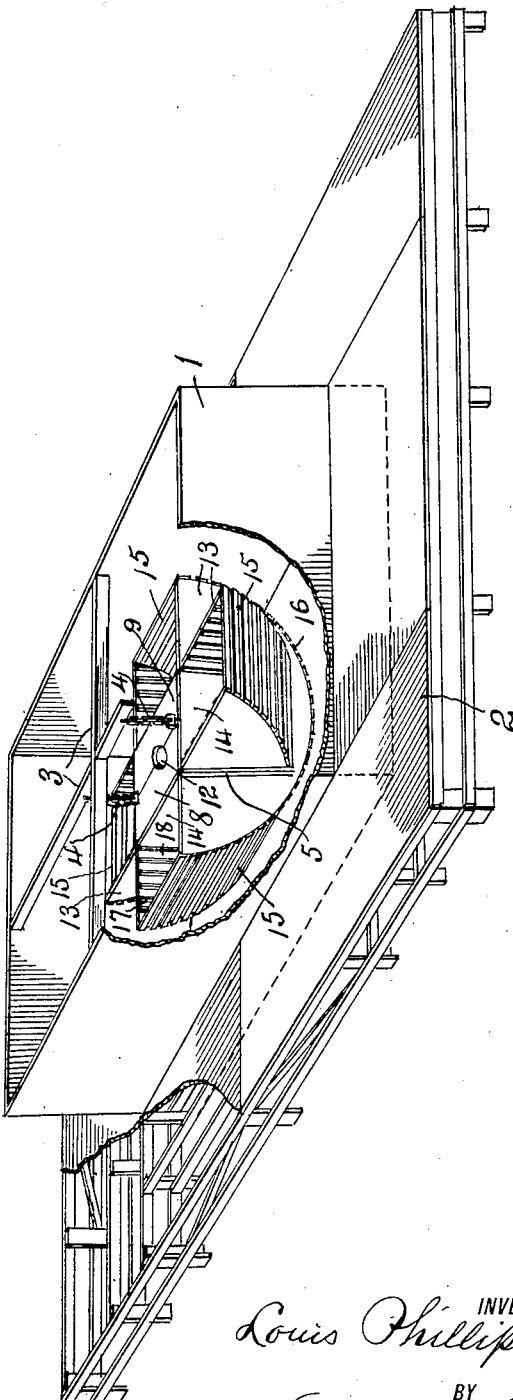

1 designates an inclosure, preferably in the form of a large rectangular box which I will term the pit. Encircling the inclosure or pit 1 may be a raised platform 2, which is preferably of the knock-down type and upon which the patrons stand when viewing the illusion over the upper edge of the box or pit 1.

Crossed beams 3 extend between sides and ends of the pit 1 and support two chains 4, to the lower ends of which are attached a swinging support, which I will term the basket 5. This basket comprises preferably a central box 6, Figs. 2 and 4, on the bottom of which is mounted a stool 7, upon which the operator sits. The top of the box 6 comprises two cover members 8 and 9, the member 8 being horizontally slidable in two grooved strips 10 secured to the top of the box 6.

Each member 8 and 9 is provided at its inner edge with a semi-circular notch 11, which coöperates with the opposite notch to form a circular hole 12, through which the neck of the operator extends, the head of the operator being above the cover members 8 and 9. The cover members permit the patrons to see only the head and neck of the operator.

The object of the illusion is to convey the impression, to any one looking over the top of the pit 1 toward the basket, that a human head detached from a body is being viewed.

For the purpose of conveying this impression, there are attached to each outer side and end of the box 6 two vertical lateral wings 13, between each pair of which is mounted an upstanding mirror 14, which is preferably slightly downwardly and outwardly inclined, as best shown in Figs. 2 and 4. The outer edge of each wing 13 is preferably arcuate, as is the bottom of the box 6. The bottom of the box 6 and arcuate edges of two opposite pairs of the wings 13 form a semi-circle, as shown in Figs. 1 and 2.

Attached to the arcuate edges of each pair of wings 13 are transverse slats 15, which are spaced apart. Cleats 16 are provided at the opposite ends of the bottom of the box 6. These cleats are spaced apart and are located between opposite mirrors 14, so that the observer obtains the impression that the cleats 16 extend the full length of the bottom of the under side of the basket.

The basket is supported by the chain 4 with its upper edge disposed below the upper edge of the pit or box 1, so that a person looking over the top of the pit or box 1 will have to look downwardly into the mirrors 14. The disposition of the latter is such that the observer looking over the top of the pit or box 1 will see reflected in the mirrors only the inner sides and bottom of the pit 1, and the wings and slats 13 and 15, together with pairs of spaced apart upwardly and downwardly extending slats 17, which are disposed parallel with each other and are attached to the inner side of each wing 13, and slats 18 which are attached to the inner sides of adjacent wings 13 and which hold the mirrors 14 in place.

In the operation of my invention, the operator, during the absence of the spectators, gets into the box 6, sits on the stool 7 and slips the cover member 8 into operative position against the cover member 9 with the operator's neck extending through the hole 12. The spectators may be then admitted and will stand upon the platform 2 around the pit 1 and will look over the top of the pit at the basket 5. They will see the operator's head, and looking into the mirrors 14 will see therein reflected the dajacent sides of the pit 1, the slats 15, 17 and 18 and the adjacent wings 13. The impression obtained will be that the spectator is viewing the opposite side of the pit and the opposite slats 15 through the space occupied by the box 6. It will thus appear that the head which the spectator sees is detached from the body and that the spectator is looking clear through the slatted basket below the head of the operator. This impression will be obtained by the spectator at any point from which he may look while standing on the platform 2.

The function of the pairs of slats 17 is to give the impression that these slats are arranged clear across the basket and to hide the function of the slats 18 which hold the mirrors in place. Each slat 18 is reflected in the mirror, so that the observer is under the impression that there are two slats 18 where in fact there is only one. Without the pairs of slats 17 arranged as described, the observer would soon learn the function of the slats 18.

The inner walls of the pit or box 1 should all be painted alike, so that the observer cannot detect any difference in appearance between the inner sides of the pit.

I do not limit my invention to the structure shown and described, as many modifications, within the scope of the appended claims, may be made without departing from the spirit of my invention.

What I claim is:—

1. In an illusion apparatus, an inclosed support for an operator having a top through which a portion of the body of the operator extends and which hides the portion of the body below the top, an inclosure in which said support is located, and over which said support is adapted to be viewed, and a mirror at one side of said support arranged to reflect over the top of said inclosure only that which is within said inclosure.

2. In an illusion apparatus, an inclosure, a support located within and below the top of said inclosure and adapted to be viewed from a point higher than the inclosure, the support being arranged to conceal from spectators at the outside of said inclosure all but a portion of the body of an operator, and a mirror interposed between said support and said inclosure and arranged to reflect over the top of said inclosure only that which is within said inclosure.

3. In an illusion apparatus, an inclosed support for an operator arranged to permit a portion only of the body of the operator to be seen, an inclosure encircling said support having an open top over which spectators may view said support, and mirrors arranged at all sides of said support between the latter and said inclosure and arranged to reflect over the top of said inclosure only that which is within said inclosure.

4. In an illusion apparatus, an inclosed support having means for concealing all but a portion of the body of an operator, an inclosure within which said support is located and over the top of which spectators may view said support, a mirror between said support and said inclosure arranged to reflect only that which is within said inclosure over the top thereof, and spaced apart slats intermediate of said inclosure and said mirror disposed so as to be reflected over the top of said inclosure.

5. In an illusion apparatus, a support for an operator arranged to conceal all but a portion of the body of the operator, which portion is adapted to be disposed above the top of said support, the support having two lateral wings, slats connecting said wings, a mirror between said support and said slats, and an inclosure within which said support is located and over which spectators may use said support and look into said mirror, the latter being disposed so as to reflect said slats over the top of said inclosure.

6. In an illusion apparatus, a support for an operator arranged to conceal all but a portion of the body of the operator, which portion is adapted to be disposed above the top of said support, said support having at each side a pair of lateral wings, slats connecting said wings, a mirror between said support and each pair of wings, and an inclosure containing said support and over which the support and said mirrors are adapted to be viewed by spectators, the slats being between the adjacent mirrors and the inclosure and adapted to be reflected by the mirrors over the top of said inclosure.

7. In an illusion apparatus, an inclosed support for an operator arranged to permit a portion of the body of the operator to extend outside of said support, the support having at one side two lateral wings, slats arranged in an arc and connecting said wings, and a mirror intermediate of said support and said slats.

8. In an illusion apparatus, means for concealing all but a portion of the body of an operator, means for supporting spaced-apart slats, slats carried by said supporting means and arranged in an arc, a mirror intermediate of the slats and said support, and means at the outer side of said slats over which spectators may view said support and said mirror, the latter being arranged to reflect said slats over the top of said last named means.

9. In an illusion apparatus, means for concealing all but an exposed portion of the body of an operator, a mirror located below said exposed portion, an inclosure in which said concealing means is located and over which spectators may see said support and look into said mirror, spaced apart slats arranged in an arc intermediate of said inclosure and said mirror, the latter being inclosed so as to reflect said slats over the top of said inclosure, and means for supporting said slats.

10. In an illusion apparatus, an inclosure, a support for an operator in said inclosure below the top thereof arranged to conceal all but an exposed portion of the operator, mirrors at all sides of said support which are exposed to the view of spectators looking over the top of said inclosure, said mirrors being located below said exposed portion intermediate of said inclosure and said support, and spaced apart slats intermediate of each mirror and the adjacent side of said inclosure, said slats being adapted to be reflected by said mirrors over the top of said inclosure.

11. In an illusion apparatus, an inclosure having an open top over which spectators may look into the inclosure, a support for an operator located within and below the top of said inclosure, the support having at each side two lateral wings, the support being arranged to conceal all but an exposed part of the operator, mirrors located one between each pair of said wings, and slats spaced apart and connecting wings of each pair, said mirrors being arranged to reflect said slats over the top of said inclosure.

12. In an illusion apparatus, an inclosure having an open top, a swinging inclosed support for an operator suspended within said inclosure below the top thereof and provided with a cover through which a portion of an operator may extend, pairs of wings extending laterally from the respective sides of said support, spaced apart slats arranged in arcs and connecting said wings of said pairs, and mirrors disposed respectively between the wings of said pairs and between said support and said slats, and arranged to reflect said slats and said wings over the top of said inclosure.

13. In an illusion apparatus, an inclosure having an open top, concealing means located within and below the top of said inclosure and arranged to conceal all but an exposed portion of an operator, the exposed portion being adapted to extend through the top and above said concealing means, pairs of lateral wings at the sides respectively of said support, mirrors disposed between said inclosure and said support and disposed one between the wings of each pair, slats attached to the inner sides of said wings and resting against the outer sides of said mirrors, slats arranged in pairs upon the inner sides of said wings and parallel with the adjacent ones of the first named slats, and spaced apart slats connecting the wings of each pair and arranged to be reflected by the adjacent mirror over the top of said inclosure.

In testimony whereof I have signed my name to this specification.

LOUIS PHILLIPS.